United States Patent [19]

Brown et al.

[11] 4,156,369
[45] May 29, 1979

[54] CONTROL LINKAGE FOR GOVERNOR AND TORQUE SENSING HYSTAT

[75] Inventors: Vaikai K. Brown, Thompson; Richard N. Fatur, Eastlake, both of Ohio

[73] Assignee: Towmotor Corporation, Mentor, Ohio

[21] Appl. No.: 760,068

[22] Filed: Jan. 17, 1977

[51] Int. Cl.² .......................................... B60K 20/00
[52] U.S. Cl. ........................................ 74/474; 74/478
[58] Field of Search ........................... 74/30, 474, 478

[56] References Cited

U.S. PATENT DOCUMENTS

| | | | |
|---|---|---|---|
| 1,447,119 | 2/1923 | Brown | 74/30 |
| 3,241,394 | 3/1966 | Rubenstein | 74/474 |
| 3,898,891 | 8/1975 | Colloton | 74/474 |
| 3,952,512 | 4/1976 | Feller | 74/474 |

OTHER PUBLICATIONS

Schwamb et al.-Elements of Mechanism-Sixth Edition-pp. 7 and 8.

Primary Examiner—Samuel Scott
Assistant Examiner—Wesley S. Ratliff, Jr.
Attorney, Agent, or Firm—Phillips, Moore, Weissenberger, Lempio & Majestic

[57] ABSTRACT

A control linkage system is disclosed for simultaneous control of an engine throttle or governor and a hydrostatic transmission from a single control pedal, and includes unidirectional linkage means including a pair of triangular-shaped link members mounted for movement about a common axis and connected by links to a unidirectional output member or a throttle control member. The unidirectional linkage means includes a pin mounted on an arm which in turn is mounted on the common axis of the link members and connected by a link and lever arm to move with a rocking foot pedal. A second linkage means including a lost motion link is connected to the pedal and to a swash plate control member of the hydrostatic transmission.

10 Claims, 4 Drawing Figures

Fig_3_

CONTROL LINKAGE FOR GOVERNOR AND TORQUE SENSING HYSTAT

BACKGROUND OF THE INVENTION

The present invention relates to control systems and pertains particularly to linkage means for simultaneous control of engine and transmission of a lift truck or the like from a common foot pedal.

Lift trucks and other similar article-handling vehicles normally require that an operator be able to manipulate the vehicle at the same time he is manipulating the article-handling implements thereof. The controls of such vehicles are normally arranged such that the steering of the vehicle and the manipulation of the article-handling means is normally controlled by the operator's hands. With such arrangements, it is also necessary that the operator be able to control both the direction and speed of the vehicle with his feet. It is also desirable that the speed and direction of the vehicle be controlled with one foot.

Many systems are proposed in the prior art with such control of such vehicles. However, such proposes prior art systems have failed to provide an optimum combination to obtain the desired functional convenience.

SUMMARY AND OBJECTS OF THE INVENTION

It is therefore a primary object of the present invention to provide a control arrangement for the convenient control of the accelerator and transmission directional control of a vehicle simultaneously with a single foot pedal.

Another object of the present invention is to provide a vehicle control arrangement that is simple and effective to provide simultaneous operation of the vehicle throttle and directional control of a vehicle by a rocking foot pedal.

A still further object of the present invention is to provide a control arrangement for a hydrostatic drive vehicle when the throttle and directional control of the vehicle may be accomplished simultaneously by a single foot pedal movable in alternate directions about a pivot point.

In accordance with the primary aspect of the present invention, a rocking foot pedal is connected through unidirectional control linkage means to obtain a unidirectional output to the engine throttle or governor, and connected through transmission control linkage means for obtaining alternate directional control of a transmission control element upon movement of a single control pedal in either direction from a neutral position.

BRIEF DESCRIPTION OF THE DRAWINGS

The above and other objects and advantages of the present invention will become apparent from the following description when read in conjunction with the accompanying drawings, wherein.

DETAILED DESCRIPTION OF THE PREFERRED EMBODIMENT

Figure 1:
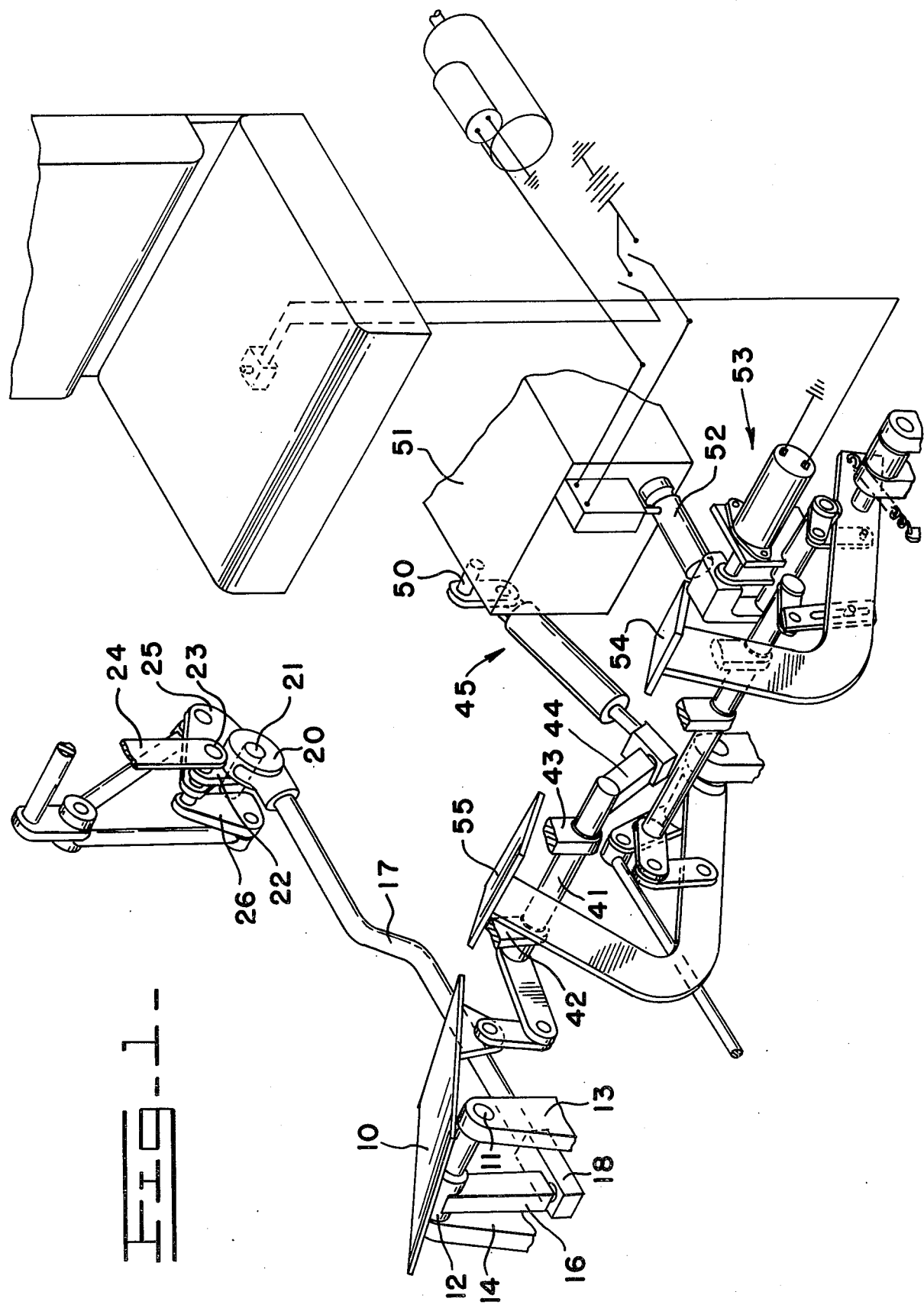
FIG. 1 is an isometric view of a control arrangement in accordance with the preferred embodiment of the present invention.
Figure 2:
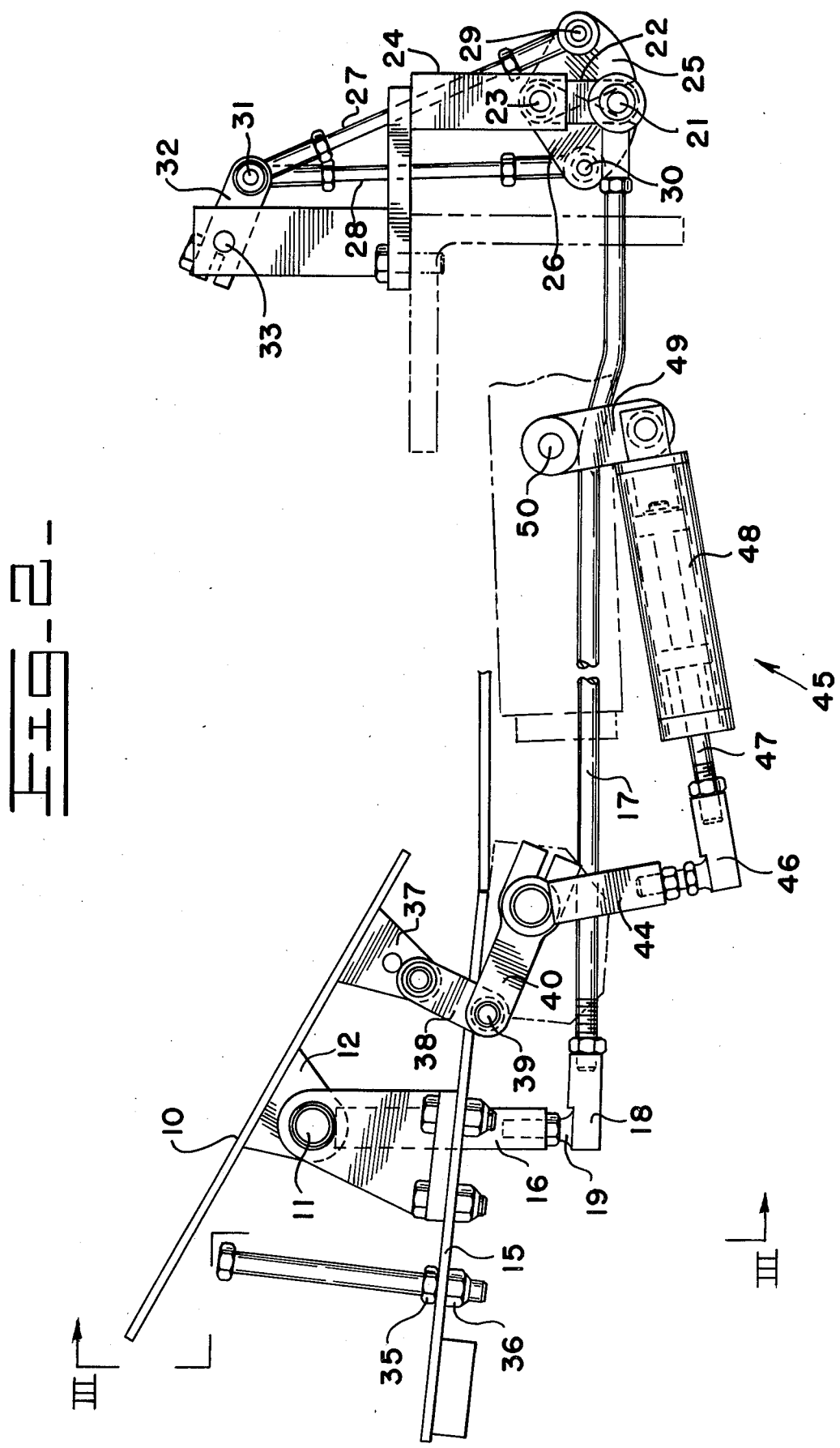
FIG. 2 is a side-elevational view of the linkage of FIG. 1 shown in the neutral position.
Figure 3:
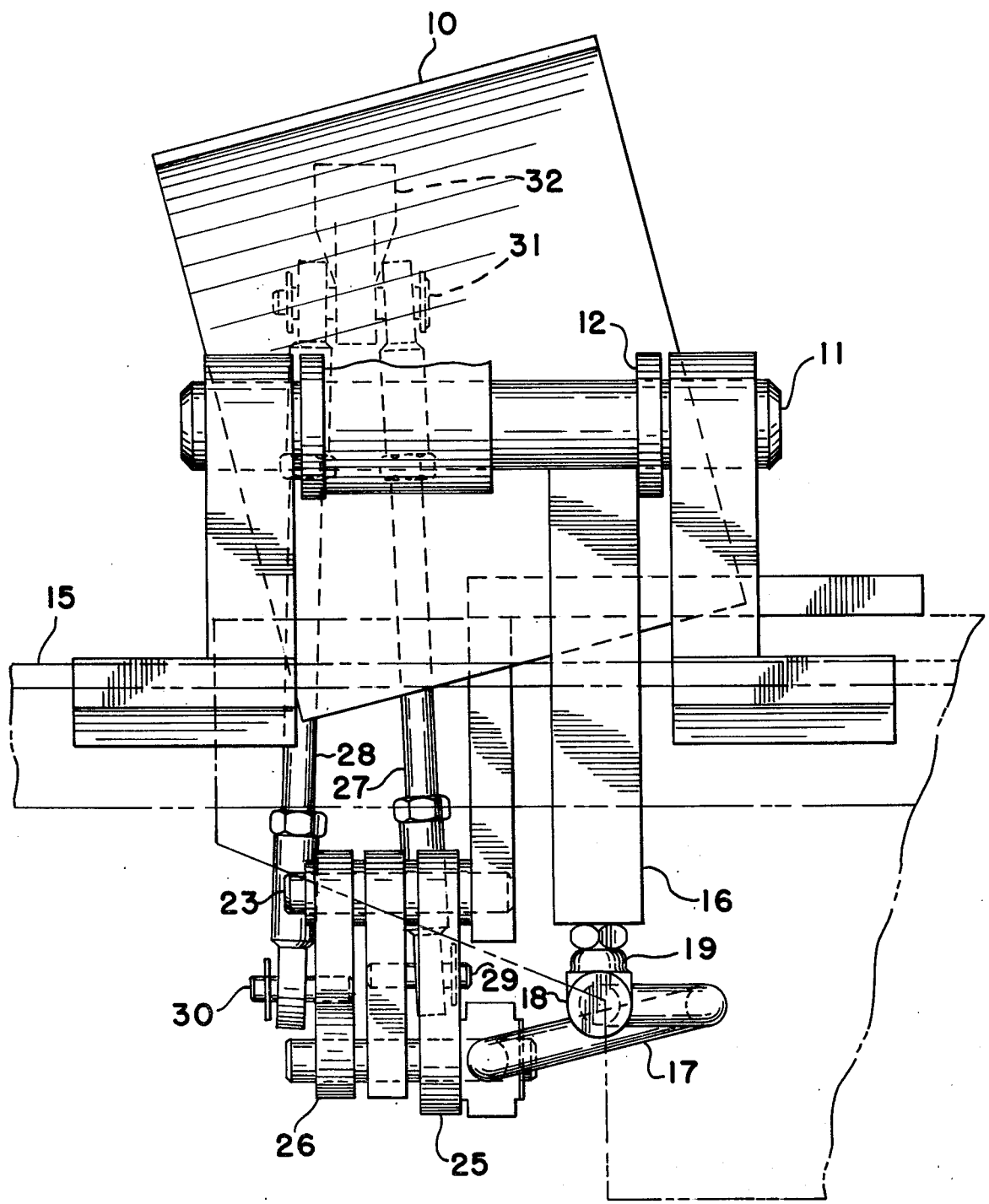
FIG. 3 is a view taken generally along lines III—III of FIG. 2.

Turning now to the drawings, and particularly to FIGS. 1 and 2, there is illustrated a control linkage arrangement in accordance with the present invention for use in a vehicle (not shown). Only that part of the lift truck and the control system necessary for an understanding of the present invention is specifically illustrated. The illustration of a complete hydraulic drive lift truck and a hydrostatic transmission therefor is illustrated, for example, in U.S. Pat. No. 3,005,562 issued Oct. 24, 1961 to Shaffer and assigned to the assignee hereof and is fully incorporated herein by reference. Other examples of hydrostatic transmissions for use in such lift trucks or the like are illustrated, for example, in U.S. Pat. No. 3,451,218 issued June 24, 1969 to Grant, and No. 3,486,335 issued Dec. 30, 1969 to Kern, et al, both of which are assigned to the assignee hereof and incorporated herein by reference.

The linkage system comprises an operator control member such as a rocker-type foot pedal 10 mounted for rocking movement about the axis of a pin 11 which extends through a bracket 12 located approximately mid-point between the ends of the pedal 10 for mounting the rocker pedal to a pair of spaced stationary brackets 13 and 14 which are connected in a suitable manner such as by bolting a stationary member such as a floor board 15 of the vehicle. While a foot pedal is illustrated, it will be apparent that a rocking lever could also be used.

The bracket 12 connected to the underside of the pedal 10 includes an arm 16 extending downward therefrom for connecting the pedal to linkage to be described. An elongated link or rod 17 having an adjustable connecting head 18 on one end thereof for adjusting the effective length of the rod or link 17 defines a universal or swivel-type connection in combination with a ball member 19 threadably secured in a normal manner to the end of the arm 16. The opposite end of the link or rod 17 includes a connecting bracket 20 connected to a pin 21. The pin 21 is mounted on an arm 22 which is mounted to pivot about the axis of a stationary pin 23 mounted in a bracket 24.

As best seen in FIG. 2, the pin 21 extends through and beyond the link 22 between a pair of substantially triangular-shaped link members 25, 26 which in turn are pivotally mounted about the common pin 23. A pair of adjustable link members 27, 28 are each pivotally connected at the lower ends 29, 30 to the members 25, 26. The links 27, 28 are pivotally connected to a common pivot point 31 at the upper end to a unidirectional output member 32 which is connected to a pin or shaft 33. The shaft 33 is connected to the throttle or governor of an engine for controlling the r.p.m. thereof. The terms "throttle" and "governor" are used herein interchangeably to mean the operator input control which controls or adjusts the r.p.m. of the engine.

The above-described linkage converts multidirectional input from the rocker pedal 10 to unidirectional output of the pin 31, the arm 32 or shaft 33 as will be hereinafter described. This motion, of course, is in reference to motion from a neutral or zero position. For example, FIG. 2 illustrates the control linkage arrangement in what would be normally considered a neutral or zero position. In this position, the pedal 10 would be in a central position with the lever arm 32 in its downward-most position and the pin 21 centered between the links 25,26 with both of the links in engagement therewith. Upon movement of the pedal 10 in either the forward or backward rocking motion, the motion is transferred through the linkage, including arm 16 and link or rod 17, to the pin 21 which in turn transmits the motion by way of one or the other of the links 25,26, through links 27,28 to the arm 32 and thence to the shaft 33.

Figure 4:
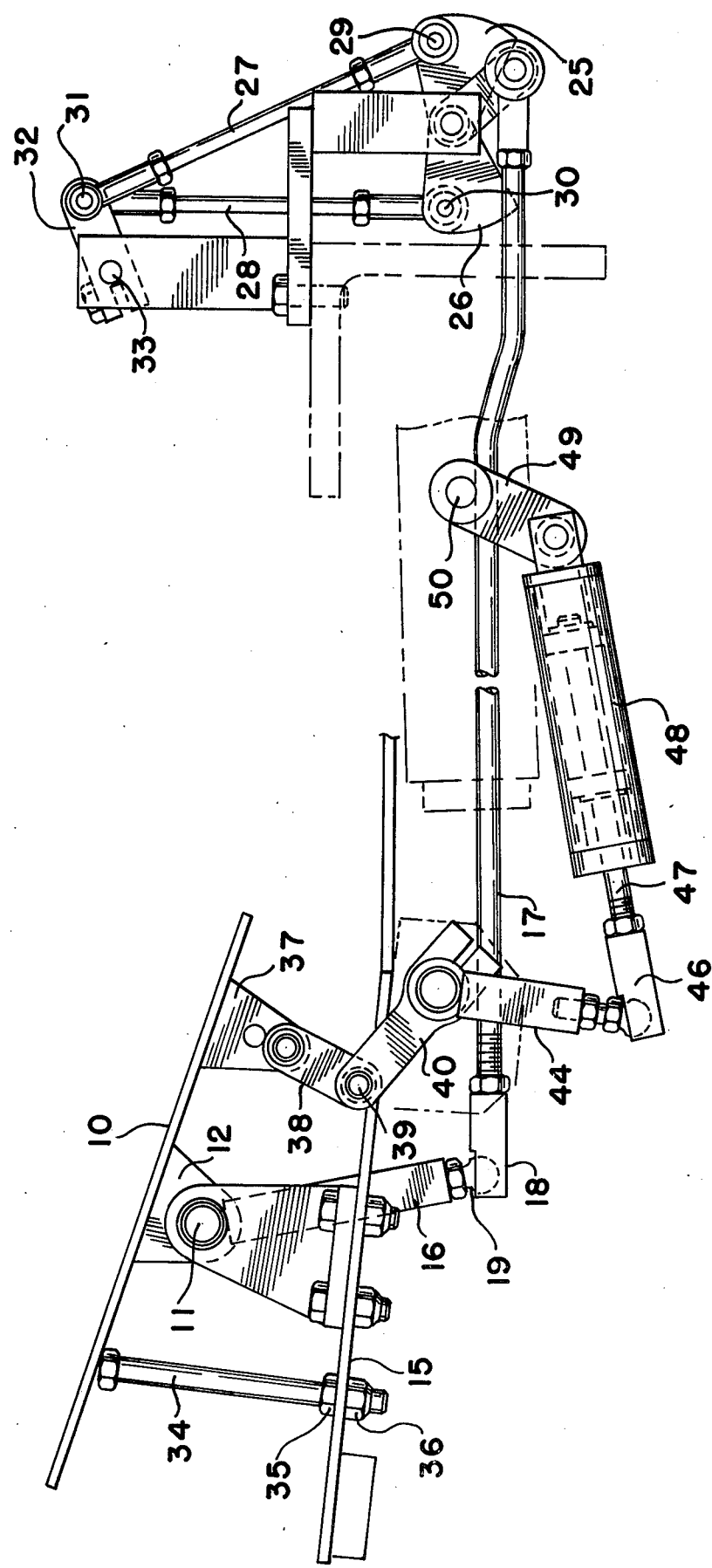
FIG. 4 is a view like FIG. 2 showing the control linkage in the position displaced from the neutral position.

As perhaps best seen in FIG. 1, the motion is transmitted through pin 21, alternatively to links 25 or 26 with which it is in contacting relation. Referring to FIG. 4, for example, the pedal 10 has been rocked forward in its forward-most position against a stop member 34 with lever 33 tilted upward from the position as shown in FIG. 2, and the shaft 32 is rotated counterclockwise from the position as shown in FIG. 2.

The stop member 34, which in this case is defined by a bolt threadably engaged at its lower end nuts or the like 35,36 disposed to either side of the floor board 13, defines the forward-most position of the pedal 10.

Suitable transmission control linkage means is also connected to the pedal 10 for movement therewith for controlling the transmission of the vehicle. This transmission linkage control means comprises a bracket 37 secured to the underside of the pedal 10 with a link 38 pivotally connected at one end to the bracket 37 and at its lower end by way of a pin 39 to an arm 40. The arm 40 is connected to one end of the shaft 41 which is mounted such as in a pair of spaced brackets 42,43 to the underside of the floor board and includes at its opposite end an arm 44.

The lever arm 44 is connected by suitable linkage means indicated generally at 45 comprising a link assembly having a swivel joint 46 at one end thereof threadably secured to the end of a rod member 47 extending into a cylinder member 48 defining a lost motion link member. The opposite end of the link 45 is connected to a lever arm 49 which is connected to a shaft 50 extending into the transmission 51 for controlling tilt of the swash plate of the hydrostatic transmission. The shaft 50 by way of linkage (not shown) controls a transmission control valve which in turn controls servo means via hydraulic fluid resulting in swash plate control. The lost motion linkage portion of the link 45 may be termed an override link and permits the accelerator pedal 10 to be advanced further in either direction when the arm 49 has reached the end of its movement. The override permits additional throttle linkage advancement when the transmission is at full displacement which normally occurs when the engine is at approximately 50% of speed. The term "lost motion or override link" as used herein means a lost motion link as used in the art, and is deliberately constructed to permit one end to move relative to the other end when a predetermined amount of force is applied thereto, and such term is not intended to refer to or cover the usual slack or slop achieved as the result of clearance or wear in a conventional link.

The hydrostatic transmission 51 is of the type normally employed in lift truck type vehicles and includes a hydraulic pump and motor combination with one of the devices, such as the pump, having a variable displacement as by swiveling the swash plate from a neutral or no-displacement position in either direction for achieving either forward or reverse drive of the vehicle. The vehicle includes further control means such as a creeper or a bypass valve 52 connected by linkage means indicated generally at 53 to a creeper pedal 54. A brake pedal 55 is connected to the usual linkage to a brake actuating mechanism.

While the above invention has been described by means of specific embodiments thereof, it is to be understood that numerous changes and modifications may be made therein without departing from the spirit and scope of the invention as defined in the appended claims.

What is claimed is:

1. A control linkage system comprising:
    an operator control member mounted for rocking motion about a pivot point in either direction from a neutral position;
    an output control member remotely positioned from said operator control member and mounted for unidirectional motion from a neutral position;
    unidirectional linkage means for connecting said operator control member to said output control member for imparting a unidirectional motion to said output control member from its neutral position upon movement of said operator control member in either direction from the neutral position, said unidirectional linkage means including first link means and second link means mounted for pivotal movement about a common axis by first pivot means, each said link means defining an arm, one arm of each of said link means pivotally connected to said unidirectional output member by second pivot means so that pivotal movement of said first and said second link means in opposite directions about said first pivot means imparts a unidirectional motion to said unidirectional output member; and
    means mounted between and positioned so as to be adapted for contacting relation with said first and said second link means and connected to said operator control member for movement in opposite directions therewith for engagement with alternate ones of said first and said second link means for alternately imparting movement thereto.

2. The control system of claim 1 wherein said first and said second link means are remotely positioned from said operator control member, and said means mounted between said link means is a pin mounted on the outer end of an arm pivotally mounted for swinging movement about said common axis.

3. The control system of claim 1 including a multidirectional output member remotely positioned from said operator control member; and,
    override linkage means connecting said operator input member to said multidirectional output member for joint movement over a first range of movement in either direction and for permitting continued movement of said operator input member after said multidirectional output member has reached the limit of its movement.

4. The control linkage system of claim 2 wherein said operator input member is a rocking foot pedal.

5. The control linkage system of claim 2 wherein said unidirectional output member is a rotatable shaft; and,
    said unidirectional linkage means includes an arm connected to said shaft, and adjustable linkage means connecting said arms of said link means to said arm connected to said shaft.

6. In an industrial vehicle having an internal combustion engine connected by hydrostatic transmission means to the drive wheels of said vehicle, a control linkage system comprising:

an operator control member mounted for rocking motion about a pivot point in either direction from a neutral position;

a throttle control member remotely positioned from said operator control member and mounted for unidirectional motion from a neutral position for increasing the r.p.m. of said engine;

unidirectional linkage means for connecting said operator control member to said throttle control member for imparting a unidirectional motion to said throttle control member from its neutral position upon movement of said operator control member in either direction from the neutral position, said unidirectional linkage means including first link means and second link means mounted for pivotal movement about a common axis, each said link means defining an arm, one arm of each of said link means connected to said throttle control member so that pivotal movement of said first and said second link means in opposite directions about said common pivot axis imparts a unidirectional motion to said throttle control member; and means mounted between and positioned so as to be adapted for contacting relation with said first and said second link means and connected to said operator control member for movement in opposite directions therewith for engagement with alternate ones of said first and said second link means for alternately imparting movement thereto.

7. The control system of claim 6 wherein said first and said second link means are remotely positioned from said operator control member, and said means mounted between said link means is a pin mounted on the outer end of an arm pivotally mounted for swinging movement about said common axis.

8. The control system of claim 6 including a transmission control member remotely positioned from said operator control member; and,
override linkage means connecting said operator input member to said transmission control member for joint movement over a first range of movement in either direction and for permitting continued movement of said operator input member after said transmission control member has reached the limit of its movement.

9. The control linkage system of claim 7 wherein said operator input member is a rocking foot pedal.

10. The control linkage system of claim 7 wherein said throttle control member is a rotatable shaft; and,
said unidirectional linkage means includes an arm connected to said shaft, and adjustable linkage means connecting said arms of said link means to said arm connected to said shaft.

* * * * *